Patented Oct. 1, 1946

2,408,426

UNITED STATES PATENT OFFICE 2,408,426

PREPARATION OF MODIFIED METHYL METHACRYLATE COMPOSITIONS

Frederick L. Johnston, Claymont, Del., assignor to E. I. du Pont de Nemours & Company, Wilmington, Del., a corporation of Delaware No Drawing. Application January 12, 1943, Serial No. 472,161

2 Claims. (Cl. 260—83)

This invention relates to the preparation of modified methyl methacrylate compositions and, more particularly, to such compositions adapted to give molded articles characterized by high resistance to distortion by heat.

Heretofore methyl methacrylate monomer has been polymerized to yield thermoplastic molding compositions. When such polymers are prepared by heating methyl methacrylate monomer in the absence of catalysts or in the presence of small concentrations of peroxide-type catalysts, the resulting molding compositions are difficult to fuse into optically homogeneous masses under heat and pressure, and, when hot, are too viscous for satisfactory molding by injection. In the past these objections have been partly overcome by various means but an outstanding difficulty has been to obtain a product which can be molded into articles that do not tend to distort at undesirably low temperatures; particularly, has this been the case where the articles have been injection molded although it also holds to a considerable extent with respect to compression molded articles. A further difficulty is to obtain a product improved in this characteristic and at the same time characterized by good moldability and yielding molded products having optical homogeneity and being free from discoloration.

An object of the present invention is to provide an improved methyl methacrylate composition characterized by good moldability and adapted to be molded into articles having high resistance to distortion by heat, optical homogeneity, and freedom from discoloration. A further and more particular object is to provide a composition adapted to be injection molded into articles having high resistance to distortion by heat. A still further object is to provide a practical and economical method of preparing such compositions. Other objects will be apparent from the description of the invention given hereinafter.

The above objects are accomplished according to the present invention by polymerizing monomeric methyl methacrylate in the presence of very small amounts of unsymmetrical alpha-olefinic compounds in which one of the carbon atoms of the double bond carries a single halogen atom.

More specifically, the polymerized methyl methacrylate composition of the present invention is prepared by polymerizing a dispersion of monomeric methyl methacrylate in a non-solvent liquid such as water in the presence of 0.01% to 3.0%, by weight of the monomer, of an unsymmetrical alpha-olefinic compound in which one of the carbon atoms of the double bond carries a single halogen atom, at a temperature of 100° C.–150° C. under autogenous pressure.

In the preferred method of carrying out this invention, small amounts of benzoyl peroxide and the selected halo-olefin are dissolved in methyl methacrylate monomer. This solution is suspended in about twice its volume of water. The water contains a small proportion of a mild dispersing agent such as the 65% sodium salt of polymethacrylic acid and is buffered to a pH of about 7.5 by means of a suitable inorganic salt. This mixture is agitated vigorously in a closed reaction vessel capable of withstanding moderate pressures. The polymerization is carried out by heating at a temperature in the neighborhood of 125° C. under a pressure of about 50 lbs./sq. in. for twenty to thirty minutes until the essential completion of polymerization is indicated by a sudden drop in pressure due to the essential disappearance of monomeric methyl methacrylate. It is preferable to prevent the reaction from becoming too violent by suitable cooling of the vessel. The mixture is then cooled and discharged from the reaction vessel. The granular product is separated from the mother liquor, washed, centrifuged, and dried by heating at 70° C to 100° C. in a circulating air oven or under vacuum, and this dried granular polymer is then masticated on hot mixing rolls for ten to fifteen minutes, removed from the rolls, cooled and comminuted to pass a ⅜" screen. The resulting product is suitable for compression or injection molding and shows special advantages when used for the latter purpose.

The following examples illustrate specific embodiments of the composition and the method of preparing same according to the present invention, all parts being given by weight unless otherwise specified:

EXAMPLE I (a)

The following solutions are made up of:

| | Parts |
|---|---|
| Distilled water | 4800 |
| Na₂HPO₄.12H₂O | 56 |
| 1% Water solution of 65% sodium salt of polymethacrylic acid | 480 |

(b)

| | Parts |
|---|---|
| Methyl methacrylate monomer | 2786 |
| Octadecyl alcohol (lubricant) | 56 |
| Trichloroethylene | 14 |

(c)

| | Parts |
|---|---|
| Benzoyl peroxide | 7 |

The ingredients in (a) are dissolved together and charged into a glass enamel lined closed reaction kettle capable of withstanding pressures up to 300 lbs./sq.in. and fitted with a stainless steel anchor shaped stirrer, stainless steel baffles, thermocouple for observing the temperature of the contents, and an outlet through the head to a pressure gauge. The catalyst (c) is freshly dissolved in (b) and the resulting solution is charged at once into the reaction kettle. The kettle is sealed and the stirrer operated at 575 R. P. M. throughout the run. External heat is applied to bring the kettle contents to a temperature of 110° C. within fifteen to twenty minutes at which time the pressure gauge shows about 45 lbs./sq.in. pressure. The heat is then shut off. Within one to two minutes the exothermic polymerization reaction begins and there is a surge of temperature and pressure to 114° C. and 53 lbs./sq.in., respectively, where the bulk of the polymerization takes place. Within about five minutes there is a rapid decrease in pressure to about 15 lbs./sq.in. and the temperature begins to drop. Stirring is continued until the kettle contents have cooled to 40° C. or below at which time the pressure gauge shows zero pressure and the kettle is opened. The product, in the form of crystal clear spherical granules up to about 1/64" diameter, is removed from the mother liquor on filter cloth and washed repeatedly with distilled water until the washings are clear. This requires a total of about 20,000 parts of wash water. Excess water is removed by means of a centrifuge and the product is dried at 100° C. for 24 hours under high vacuum.

The fine granular product is converted to molding powder suitable for injection molding by hot pressing into sheets at 160° C., followed by chopping into particles which will pass a 3/8" screen. This molding compound is then injection molded in an injection molding machine, suitably a 1-ounce capacity De Mattia vertical injection molding machine built by the De Mattia Machine and Tool Company, Clifton, N. J. The machine is supplied with a die capable of molding test specimens whose measurements are 2½" x ½" x 0.065". The polymer is injected into the die through a gate at the end of the cavity with the die closing and injection taking place during a period of 1.25 seconds. The machine is timed to maintain piston pressure on the molding powder and clamping pressure on the die simultaneously for fifteen seconds to enable the molding to set up in the die. A new injection is made every sixty seconds. The polymer may be molded under several temperature conditions to yield specimens of attractive appearance. When the heating cylinder delivers polymer at 220° C. into the cold die, satisfactory moldings are produced under 22,700 lbs./sq.in. piston pressure. Moldings of excellent clarity and surface characteristics are obtained which are faithful reproductions of the die cavity. Injection molded strips molded as above are found to "soften" at 86° C. according to the following method.

The strip 2½" x ½" x 0.065" is mounted horizontally by one end in a clamp, cantilever fashion, the supported end sticking ¼" into a vertical slot in the clamp so that the strip is supported ¼" from the end. At a spot ¼" from the opposite end on the upper edge a weight of 27.5 g. is placed so that it rests entirely on the test strip and is free to move up or down with the strip. The assembly (excepting the weight) is immersed in a bath of circulating mineral oil which is uniformly heated at a steady rate of 2° C. per minute. The "softening" temperature is observed as that bath temperature at which the test strip sags enough to permit the 27.5 g. weight to drop 0.06". It is to be understood that all softening temperatures of molded specimens subsequently mentioned in this specification are determined by this method.

A similar methyl methacrylate polymer polymerized as above but without the addition of trichloroethylene and converted to molding powder in the same manner yields injection molded test strips which soften at 64° C. by the above determination.

The above example is repeated using varying quantities of trichloroethylene. When the products are worked up and molded as above, injection molded softening temperature specimens are obtained which soften as shown in the following table:

| Concentration of trichloroethylene (based on methyl methacrylate monomer) | Softening temperature of injection molded specimen 2½"x½"x0.065" |
|---|---|
| | °C. |
| 0.0% (blank for control) | 64 |
| 0.25% | 82 |
| 0.50% | 86 |
| 0.75% | 85 |
| 1.00% | 91 |
| 2.00% | 85 |

EXAMPLE II

The ingredients for a granular polymerization are assembled as follows:

(a)

| | Parts |
|---|---|
| Distilled water | 4800 |
| Na₂HPO₄.12H₂O | 56 |
| 1% Water solution of 65% sodium salt of polymethacrylic acid | 480 |

(b)

| | Parts |
|---|---|
| Methyl methacrylate monomer | 2786 |
| 2-Chloropropene | 14 |

(c)

| | Parts |
|---|---|
| Benzoyl peroxide | 7 |

The ingredients are charged into a kettle as described in Example I and polymerization is conducted in a similar manner. Heat is applied as in Example I and after the heat has been cut off the exothermic polymerization reaction causes a surge of temperature and pressure to 125° C. and 70 lbs./sq. in., respectively. The bulk of the polymerization takes place under these conditions. The resulting polymer is worked up and converted to molding powder and injection molded in the manner described in Example I. When the heating cylinder delivers polymer at 230° C. into the cold die, satisfactory moldings are produced under 25,700 lbs./sq. in. piston pressure. The moldings obtained are brilliantly clear and are faithful reproductions of the die cavity. Injection molded strips from the 2½" x ½" x 0.065" die soften at 99° C. according to the softening temperature determination described under Example I.

A similar methyl methacrylate polymer polymerized as above but without the addition of 2-chloropropene and converted to molding powder in the same manner yields injection molded test strips which soften at 74° C. by the above determination.

Example II is repeated using varying quantities of 2-chloropropene. When the products are worked up and molded as above, injection molded softening temperature specimens are obtained whose softening temperatures according to the method decribed under Example I are as follows:

| Concentration of 2-chloropropene (based on methyl methacrylate monomer) | Softening temperature of injection molded specimen 2½" x ½" x 0.065" |
|---|---|
|  | ° C. |
| 0.0% (blank for control) | 74 |
| 0.20% | 85 |
| 0.50% | 99 |
| 0.75% | 98 |
| 1.00% | 99 |

EXAMPLE III

A polymerization is carried out using the following ingredients:

(a) Parts
Distilled water ---------------------- 4800
Na₂HPO₄.12H₂O ---------------------- 56
1% Aqueous solution of the 65% sodium salt of polymethacrylic acid ---------- 600

(b) Parts
Methyl methacrylate monomer ---------- 2772
1-Chloro-3-hydroxypropene-1 ---------- 28

(c) Parts
Benzoyl peroxide --------------------- 7

The above ingredients are polymerized according to the general method described in Example I. The bulk of the polymerization takes place at a temperature of 121° C. under a pressure of 48 lbs./sq. in. When the resulting granular polymer is worked up and injection molded according to the general method described in Example I, polymer delivered from the heating cylinder at 220° C. is readily injection molded into specimens of excellent appearance under a piston pressure of 23,300 lbs./sq. in. A specimen 2½" x ½" x 0.065" is found to soften at 87° according to the method described in Example I. A corresponding unmodified control polymer softens at 74° C.

EXAMPLE IV

The following solutions are made up:

(a) Parts
Distilled water ---------------------- 4800
Na₂HPO₄.12H₂O ---------------------- 56
1% Aqueous solution of the 65% sodium salt of polymethacrylic acid ---------- 600

(b) Parts
Methyl methacrylate monomer ---------- 2772
Methyl alpha-chloracrylate monomer --- 28

(c) Parts
Benzoyl peroxide --------------------- 7

The above ingredients are polymerized in the general manner described in Example I. During the exothermic polymerization reaction the bulk of the polymerization takes place at a temperature of 126° C. under a pressure of 55 lbs./sq. in. When the resulting granular polymer is worked up and injection molded, polymer delivered from the heating cylinder into the injection die at 200° C. molds readily under a piston pressure of 23,300 lbs./sq. in. An injection molded specimen 2½" x ½" x 0.065" is found to soften at 89° C. according to the softening temperature determination described under Example I.

The above example is repeated using 2% of methyl alpha-chloracrylate monomer (based on methyl methacrylate monomer) instead of 1% and an injection molded specimen 2½" x ½" x 0.065" is found to soften at 95° C. as compared to 74° C. for an unmodified control.

It will be understood that the above examples are merely illustrative and that the present invention comprises, in its broader aspects, the polymerization of monomeric methyl methacrylate in the presence of small amounts of any unsymmetrical alpha-olefinic compound in which one of the carbon atoms of the double bond carries a single halogen atom, to obtain a product especially suited for injection and compression molding.

The invention contemplates the use of any unsymmetrical alpha-olefinic compound as herein defined. The structure and constitution of the rest of the molecule of the halo-olefin is relatively immaterial as long as it does not contain chromophoric structures which would impart color to the product or functional groups that inhibit the polymerization of methyl methacrylate. In order to avoid the cumbersome and impractical use of gaseous modifiers, it is preferred to employ halo-olefins of molecular weight above 70 and chloro-olefins are preferred.

Compounds which are closely related chemically to the herein specified halo-olefins but which do not fall within the specific definition of being unsymmetrical alpha-olefinic compounds in which one of the carbon atoms of the double bond also carries a single halogen atom, fail to produce significant improvements in methyl methacrylate polymers. Thus if the process of Example II is repeated using small concentrations of other chlorine containing compounds closely related to 2-chloropropene, trichloroethylene, etc., the following results are obtained:

| Concentration of modifier (based on methyl methacrylate monomer) | Softening temperature of injection molded specimen 2½" x ½" x 0.065" |
|---|---|
|  | ° C. |
| 0.0% (blank for control) | 74 |
| 0.50% tetrachloroethylene | 71 |
| 0.15% symmetrical dichloroethylene | 75 |
| 0.50% symmetrical dichloroethylene | 76 |
| 0.50% carbon tetrachloride | 75 |
| 0.25% chloroform | 74 |
| 0.50% chloroform | 73 |
| 1.00% chloroform | 70 |
| 0.20% chloroacetone | 77 |

In general, the use of the specific halogenated olefins defined above as modifiers for methyl methacrylate according to this invention leads to polymers that show superior heat resistance in injection molded specimens. However, the concentration of the particular halogenated olefin has an important bearing on the properties of the molded product, and equivalent effects are obtained with different concentrations for each specific halogenated olefin. This is obvious in view of the differences in activity of the various modifiers contemplated and their differing relative molecular weights. In general, the concentration of specific halogenated olefin required is greater the higher the molecular weight of the specific halogenated olefin. But only relatively small amounts of the modifiers defined above are required, and the present invention contemplates the use of these modifiers in concentrations only up to about 3% by weight of the methyl methacrylate monomer. Particularly with very active modifiers, concentrations as low as 0.01% produce significant improvements.

It is preferred to carry out the present invention by polymerizing methyl methacrylate compositions while dispersed in a non-solvent such as water. Temperatures of polymerization may be from 100° C. up to temperatures of 150° C. or higher, with a temperature of at least 125° C. preferred, in closed reaction equipment suitably designed to withstand the autogenous pressures developed. As the reaction temperature is increased, the concentration of benzoyl peroxide catalyst may be correspondingly decreased from about 1% (based on methyl methacrylate monomer) at 100° C. to 0.5% in the range of 110° C. to 115° C. and to 0.25% in the range of 120° C. to 130° C. Above this temperature the catalyst concentration is further decreased, and at temperatures of 150° C. and above the catalyst may be omitted entirely. At any given temperature a catalyst concentration is selected which yields a product of suitable molecular weight distribution for optimum molding properties.

Catalysts other than benzoyl peroxide are used in corresponding amounts. Thus didodecyl peroxide, diethyl peroxide, hydrogen peroxide, persulfuric acid and its salts, and similar catalysts may be suitably used.

The use of dispersants such as the 65% sodium salt of polymethacrylic acid is optional. The amount required generally varies in inverse ratio to the effectiveness of agitation during polymerization. The amount and effectiveness of the dispersant selected, if any, is preferably so limited as to prevent the formation of a permanent suspension and merely sufficient to keep droplets of the methyl methacrylate compositions from coalescing during polymerization. The water phase of the polymerization system may suitably be buffered to a pH at which the selected dispersant is the most effective. A pH of less than 4 or above 10 is generally to be avoided because of the tendency of methyl methacrylate monomer to hydrolyze under these conditions. The products of this invention can also be prepared by other methods of polymerization, such as solution, emulsion and bulk polymerization processes.

Any of the customary methods for converting granular thermoplastic polymers to injection molding compositions such as by masticating on heated rolls or by passing through a screw stuffer followed by cooling and chopping to convenient size may be used on products of the present invention.

Plasticizers or lubricants may be added to the products of this invention either during polymerization as in Example I or during subsequent mastication of the polymer on heated rolls. Suitable dyes or pigments may also be added in similar manner for imparting special appearance effects to the polymer.

The products of this invention are useful as molding powders for the preparation of valuable articles by the known methods of compression or injection molding commonly used for shaping thermoplastic materials. When molded by the process of injection molding, the products of this invention have a distinct advantage over previously known methyl methacrylate polymers in that the molded articles show a much greater resistance to distortion by heat while at the same time being optically homogeneous and free from discoloration. The products of this invention can be extruded into tubing, filaments and rods.

As many apparently widely different embodiments of this invention may be made without departing from the spirit and scope thereof, it is to be understood that the invention is not limited to the specific embodiments thereof except as defined in the appended claims.

I claim:

1. Process of preparing a modified methyl methacrylate composition which comprises polymerizing a dispersion of monomeric methyl methacrylate in water in the presence of 0.01% to 3.0% by weight of the monomer of trichloroethylene at a temperature of 100° C.–150° C. under autogenous pressure.

2. A modified methyl methacrylate molding composition adapted to be molded into articles having a high resistance to distortion by heat, said composition comprising methyl methacrylate polymerized in the presence of 0.01% to 3.0% by weight of the monomer of trichloroethylene while dispersed in water, said polymerization being carried out at a temperature of 100° C.–150° C. under autogenous pressure.

FREDERICK L. JOHNSTON.